United States Patent [19]

Masterson, Jr. et al.

[11] 4,344,656
[45] Aug. 17, 1982

[54] AIR SUSPENSION SYSTEM FOR PIGGYBACK TRANSPORTATION OF GOODS

[75] Inventors: Robert C. Masterson, Jr., Sugar Grove, Ill.; R. Gordon Thomas, Portsmouth; John G. Johnson, Virginia Beach, both of Va.

[73] Assignee: Air Rail, Inc., Sugar Grove, Ill.

[21] Appl. No.: 118,642

[22] Filed: Feb. 4, 1980

[51] Int. Cl.³ .............................................. B60T 13/74
[52] U.S. Cl. ......................................... 303/2; 303/85; 303/86; 410/87
[58] Field of Search .............................. 410/3, 56–65, 410/66, 87; 303/1, 86, 85, 80, 64, 7, 2; 267/DIG. 1, 64.11–64.28; 105/3, 4

[56] References Cited

U.S. PATENT DOCUMENTS

| | | | |
|---|---|---|---|
| 3,095,987 | 7/1963 | Sable | 410/87 X |
| 3,130,688 | 4/1964 | Gutridge et al. | 410/57 |
| 4,227,843 | 10/1980 | Damm | 410/87 X |

*Primary Examiner*—Douglas C. Butler
*Attorney, Agent, or Firm*—Laff, Whitesel, Conte & Saret

[57] ABSTRACT

A system for preventing damage to cargo shipped in air-ride suspension semi-trailers loaded on railroad flat cars which comprise at least part of a freight train is provided. The system comprises a coupling element connected to the air brake line of the freight train. The coupling element is connected to an air reservoir mounted on the flat car or on the semi-trailer and supplies compressed air to the reservoir from the brake line of the train. The coupling element includes a valve to prevent air from flowing from the train brake line to the air reservoir when the air pressure in the brake line drops below a predetermined safety level to prevent unwanted activation of the train's brakes. The air reservoir is connected to the air line of the semi-trailer and provides compressed air to the air bags which comprise the air suspension system of the semi-trailer. When the bags are inflated with compressed air from the brake line of the train, they suspend the semi-trailer above its rear axles and cushion the semi-trailer from the lateral sway and rough ride of the flat car.

20 Claims, 12 Drawing Figures

AIR SUSPENSION SYSTEM FOR PIGGYBACK TRANSPORTATION OF GOODS

BACKGROUND OF THE INVENTION

This invention relates to systems for preventing damage to cargo shipped in air-ride suspension semi-trailer trucks loaded on railroad flat cars, commonly referred to as the "piggyback" method of railroad transportation, and more particularly to means for and methods of controlling the air-suspension system of the semi-trailers while in piggyback transportation.

Cargoes of a fragile nature are often transported by the household moving industry in semi-trailer trucks equipped with air-ride suspension rather than in trucks provided with conventional spring-type suspension systems. For example, furniture and household goods, computers, data processing equipment, telephone equipment, copying and duplicating equipment, electronic equipment, and the like are usually transported by air-ride suspension semi-trailer trucks because air-ride trucks provide a much smoother ride than conventional trucks, offering more protection against possible damage during transport.

Semi-trailer trucks equipped with air-ride suspension are often provided with four large air bags located between the underside of the semi-trailer body and the rear axles, one bag being located above each of the four sets of rear wheels. An air line from each bag extends to a central valve connected to the main air line. The main air line extends to the front of the semi-trailer where it is connected to a compressor mounted on the tractor used to pull the semi-trailer. The compressor is usually designed to maintain about 30 psi of pressure in each bag. When inflated, the air bags suspend the semi-trailer body above the rear axles and cushion the semi-trailer body and its contents against the vertical movement of the axles. The inflated air bags comprise the sole suspension system for the semi-trailer; no other suspension system is provided in air-ride trucks.

The central air valve is designed to maintain a constant level of pressure in each bag. This valve (part Nos. 90054114 and 90054113) is manufactured by Nu-Way Suspension Systems, Inc. of Muskegan, Mich. and can be purchased commercially." For example, when a set of wheels passes over a bump in the road the air bag situated above the wheels is compressed. To maintain equilibrium in the ride of the semi-trailer, air exhausts from the compressed bag through the central valve. When the wheels move downwardly after passing over the bump, air is supplied to the bag as it returns to its normal volume. In addition, when a rough road causes the wheels on one side of the semi-trailer to move upwardly and those on the other side to move downwardly, the central air valve supplies air to the air bags in a manner which enables the semi-trailer to maintain its equilibrium and avoid lateral sway. The central valve enables air to pass from the air bags which are being compressed by the upwardly moving wheels to the air bags which have room to expand above the downwardly moving wheels, thereby maintaining a level semi-trailer bed. When the wheels return to their normal position, the air valve enables the air to return from the formerly expanded air bags to the formerly compressed air bags. Thus, the semi-trailer is prevented from swaying from side to side.

Due to a certain amount of leakage inherent in the system and the exhausting of air that occurs as the wheels travel over bumps in the road, a constant supply of air must be provided to maintain the pressure in the air bags.

Transportation of goods by the piggyback method is efficient and economical. It combines many of the best features of railroad and highway transportation. For example, transportation of cargo by truck enables delivery and pick up at locations which cannot be reached by a rail line or spur; however, trucks cannot carry cargo over long distances as economically as rail transportation. Railroads use approximately 600 to 800 BTU's per ton mile to transport cargo by flat car while a diesel truck uses approximately 2000 to 2100 BTU's per ton mile to transport the same cargo. Hence, the amount of energy required to ship cargo by rail often averages about 50% to 60% less than the energy required when transportation is exclusively by truck. There is also a savings in manpower since a separate driver is not required for each truck while it is being carried by a train. In addition, the piggyback method provides a quick and efficient means for loading cargo on a train.

Despite the many advantages of the piggyback method of transporting cargo, a serious problem exists making it impractical to transport by the piggyback method the fragile types of cargo usually carried in air-ride suspension semi-trailer trucks. Presently, air-ride suspension semi-trailers are not mounted on railroad flat cars for transportation by the piggyback method since there is no readily obtainable source of compressed air to inflate the air bags. Although compressed air is used in the train's braking system, use of this supply of air can create problems. Bleeding off air from the braking system must be carefully controlled to prevent unwanted activation of the train's air brakes.

Because the air bags located under the air-ride semi-trailer would not be inflated when the semi-trailer is mounted on the railroad car, the lateral sway and rough ride frequently encountered during rail transport would cause severe damage to the cargo contained in the semi-trailer. Furthermore, it is not practical to transport the fragile type of cargo usually carried in air-ride trucks by the piggyback method in trucks equipped with conventional suspension systems. Conventional truck suspension systems are not adequate to protect such fragile cargo from damage caused by the lateral sway and rough ride encountered in rail transport. Thus, there is a need for a system to inflate the air bags of an air-ride suspension semi-trailer during transport by the piggyback method to prevent damage to the goods carried in the semi-trailer.

Accordingly, an object of the present invention is to provide new and improved systems for protecting cargo from being damaged during transport by the piggyback method by utilizing the air-ride suspension systems of semi-trailers while they are mounted on railroad flat cars.

A further object of our invention is to provide systems for operating the air-ride suspension systems of semi-trailers while they are mounted on railroad flat cars by utilizing the compressed air in the brake line of a freight train.

Another object of our invention is to provide systems for operating the air-ride suspension systems of semi-trailers while they are mounted on railroad flat cars by utilizing the compressed air in the brake line of freight trains, while preventing the brakes of the trains from being activated when the compressed air is bled off.

In the preferred embodiment of our invention, an air-ride semi-trailer truck is mounted on a railroad flat car provided with an air reservoir. The air reservoir is connected to the train brake line by means of a coupling element which enables air to be bled off from the brake line without activating the train brakes. The coupling element is provided with a valve which prevents compressed air from the train brake line from flowing to the air reservoir when the air pressure in the brake line falls below a predetermined safety level. The valve also prevents air from flowing from the air reservoir to the brake line.

The air reservoir is also connected to the air-ride suspension system of the semi-trailer and provides compressed air, obtained from the train brake line, to inflate the air bags and thus suspend the semi-trailer body above the rear axles. The semi-trailer body is thus cushioned by the air bags against the rough ride and lateral sway of the train. A regulator valve disposed in the air line connecting the air reservoir to the air-ride suspension system measures the air pressure in the air bags and insures that a constant fixed pressure is maintained in the air bags by the air reservoir.

BRIEF DESCRIPTION OF THE DRAWINGS

Preferred embodiments of the invention are shown in the attached drawings.

DETAILED DESCRIPTION OF THE INVENTION

Figure 1:
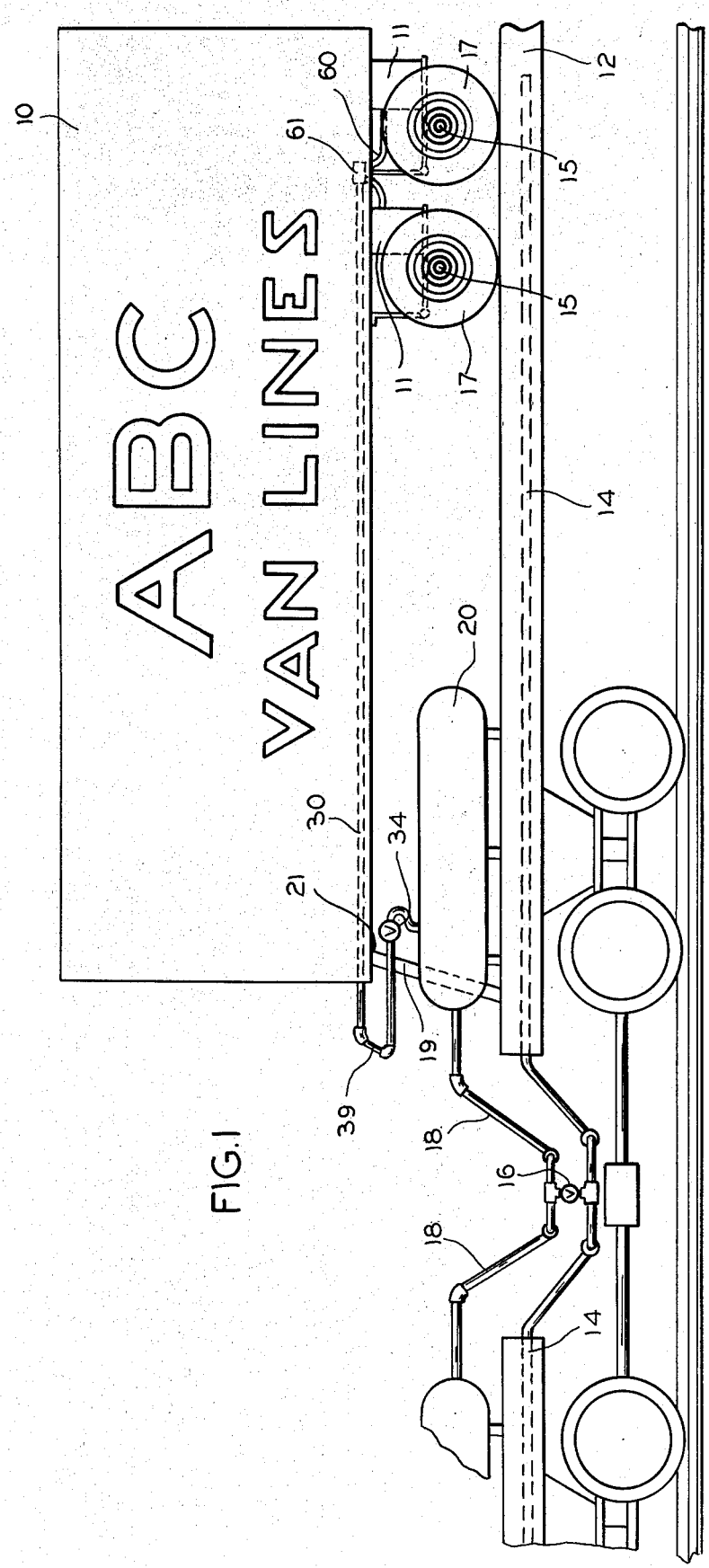
FIG. 1 is a side elevational view of a piggyback semi-trailer mounted on a railroad flat car to illustrate a method of transporting cargo by using one embodiment of the disclosed invention.
Figure 3:
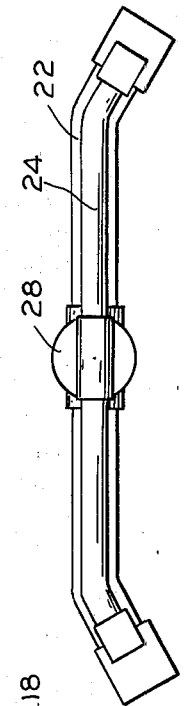
FIG. 3 is a plan view of a coupling means forming part of one embodiment of the invention.

As shown in FIG. 1, semi-trailer 10 rests on flat car 12 for piggyback transportation by rail. The semi-trailer 10 is supported on flat car 12 by rear wheels 17 and support 19, which acts as a pivot at point 21. In common practice several flat cars supporting similar trailers are connected together in series to form at least part of a freight train.

Figure 7:
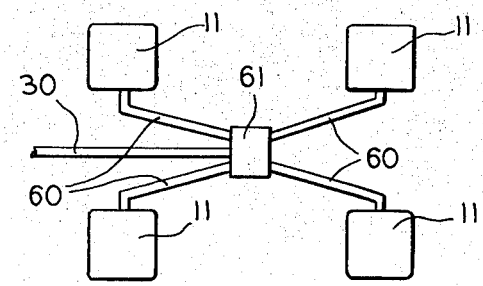
FIG. 7 is a schematic showing the air bags and a central valve forming part of the air-ride suspension system of a semi-trailer truck.

Air bags 11 are disposed between the body of semi-trailer 10 and rear axles 15. As shown in FIG. 7, air bags 11 are connected to the main semi-trailer air line 30 by lateral air lines 60, with the connections being made at central valve 61.

Figure 2:
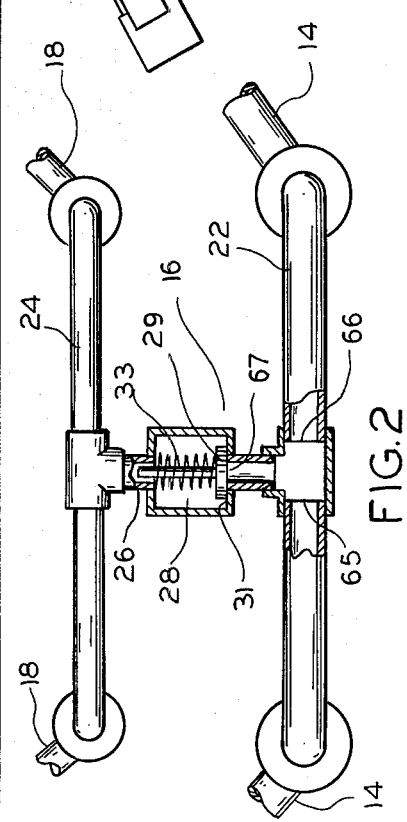
FIG. 2 is a cross-sectional view of a coupling means forming part of one embodiment of the invention.

The compressed air system for powering the train brakes B extends from a compressor CP in the locomotive engine LE to each car C1, C2 of the train via air lines 14 which are connected between the cars. This comprises the air braking system of the train. In one embodiment of our invention shown in FIG. 1, at the coupling point between a railroad car carrying a semi-trailer 10 and at least one adjacent car, coupling element 16 is employed to connect air lines 14. As shown in more detail in FIG. 2, coupling element 16 is generally H-shaped, having hollow arms 22 and 24, connected by hollow stem 26. Arm 22 is connected to the air brake line 14 of the train and arm 24 is connected to supplemental air line 18. Air line 18 is connected to air reservoir 20. Thus, air can be bled off from brake line 14 through coupling element 16 and supplemental air line 18 for storage in air reservoir 20 located on each railroad car 12 carrying a semi-trailer 10 with air-ride suspension.

Air pressure in train brake line 14 is maintained at a suitable pressure such as 90 psi by the compressor in the locomotive engine. The train brakes are activated when the pressure in train brake line 14 falls below a much lower predetermined pressure such as 60 psi. Air may be bled off from train brake line 14 without activating the train brakes so long as the pressure in train brake line 14 does not fall below the predetermined braking pressure.

It is essential to prevent the air pressure in train brake line 14 from falling below a suitable safety level which exceeds the braking pressure when air is bled off from line 14 through coupling element 16 and supplemental air line 18 to air reservoir 20. Valve 28 is located in coupling element 16 to prevent the pressure in brake line 14 from falling below the safety level when bleeding off air to reservoir 20. Air enters valve 28 at input port 65 and flows through output port 66 to the air brake line 14. Plunger 29 sits on valve seat 31 and is biased against movement away from valve seat 31 by spring 33 to keep output port 67 closed. The tension of spring 33 is chosen so that output port 67 will open only if the pressure in air brake line 14 is greater than the braking pressure. For example, if the braking pressure is 60 psi, spring 33 can be chosen so that it takes at least 70 psi of pressure to force plunger 29 up off of valve seat 31 and thereby enable air to flow from brake line 14. When the pressure in the train brake line 14 falls below 70 psi, air is not permitted to flow from brake line 14 through valve 28 to supplemental air line 18, thus preventing unwanted activation of the train brakes by bleeding air from the train brake line 14. Thus, air can be bled off from train brake line 14 to be stored in air reservoir 20 without degrading the reliability of the train braking system.

The flow of air through output ports 66 and 67 may be further controlled, if desired, by preselecting the area of the output ports to enable a predetermined volume of air to flow through the ports during a unit period of time.

Valve 28 also prevents air from flowing from supplemental air line 18 to air brake line 14 when pressure is higher in air line 18. For example, when pressure in reservoir 20 is 90 psi and pressure in the train brake line 14 is 75 psi, plunger 29 is held closed against the valve seat 31, thereby preventing air from being drained from reservoir 20.

Demand air line 39 leads from air reservoir 20 to the semi-trailer air line 30, which supplies air bags 11 with pressurized air. Regulator valve 34 measures the air pressure in bags 11 and insures that a constant fixed pressure is maintained in bags 11 by means of air supplied from reservoir 20.

In the preferred embodiment of our invention, air reservoir 20 has a large capacity, such as 30 cubic feet, for example, and regulator valve 34 is set to maintain a constant pressure in air bags 11 such as approximately 30 psi.

Figure 5:
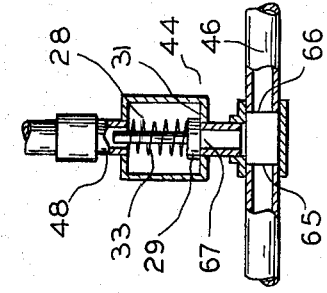
FIG. 5 is a cross-sectional view of a coupling means forming part of a second embodiment of the invention.
Figure 4:
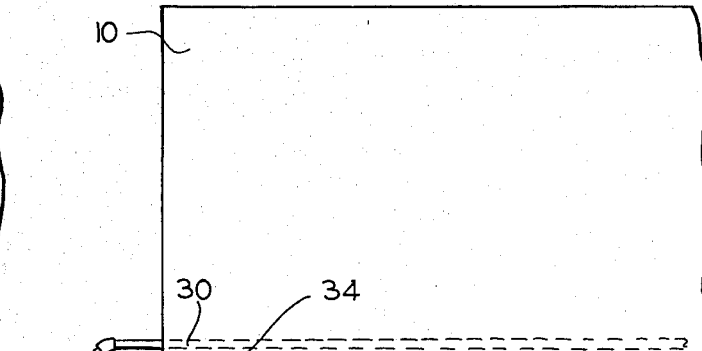
FIG. 4 is a fragmentary side elevational view of a piggyback semi-trailer mounted on a railroad flat car to illustrate a method of transporting cargo by using a second embodiment of the disclosed invention.

In an alternative embodiment of our invention shown in FIGS. 4 and 5, T-shaped coupling 44 is inserted in air line 14 instead of coupling element 16.

As shown in FIGS. 4 and 5, coupling 44 comprises hollow arm 46 and hollow stem 48. Arm 46 is connected to brake line 14 while stem 48 is connected to supplemental air line 50, which leads to air reservoir 20. As in the first embodiment of the invention described herein, valve 28 is located in coupling element 44 to prevent the air pressure in air brake line 14 from falling below the predetermined safety level when bleeding off air to reservoir 20.

Figure 6:
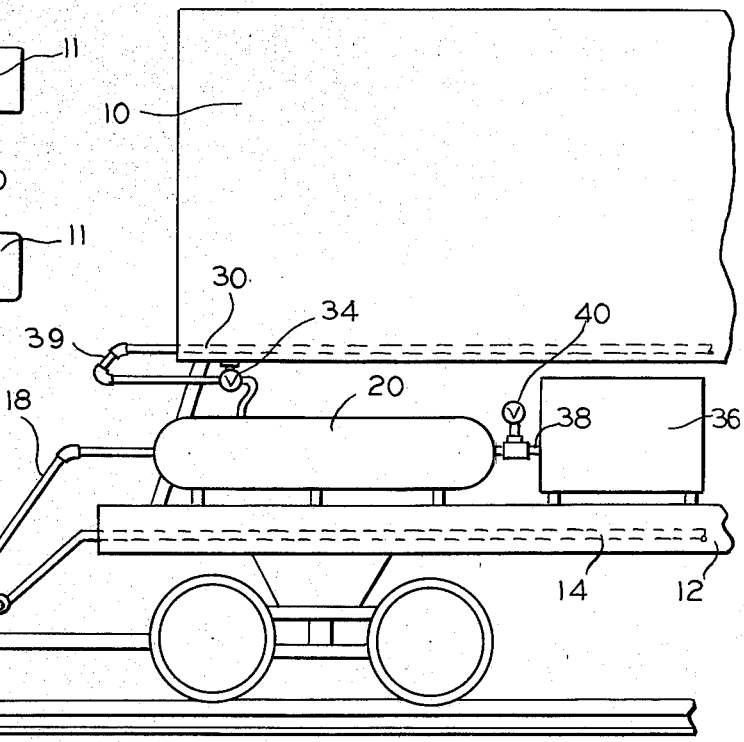
FIG. 6 is a fragmentary side elevational view of a piggyback semi-trailer mounted on a railroad flat car to illustrate a method of transporting cargo by using a third embodiment of the disclosed invention.

A third embodiment of our invention (FIG. 6) can be used in conjunction with either of the above-described embodiments. Diesel compressor 36 is a separately powered source of compressed air and is mounted on flat car 12 and connected to air reservoir 20 by supply air line 38. Compressor switch valve 40, located in supply air line 38, controls diesel compressor 36. When the air pressure in reservoir 20 falls below a predetermined level and air cannot be obtained from train brake line 14, switch valve 40 activates the diesel driven compressor 36 in order to restore and maintain the required level of air pressure in reservoir 20. Alternate sources of energy and as a battery or gasoline engine can be used instead of diesel compressor 36.

Figure 8:
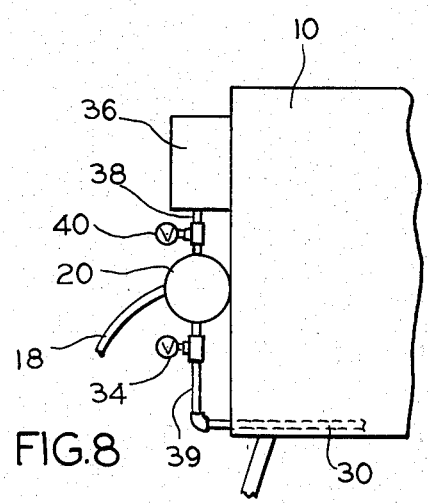
FIG. 8 is a fragmentary side elevational view of a piggyback semi-trailer mounted on a railroad flat car to illustrate a method of transporting cargo by using a fourth embodiment of the disclosed invention.

In a fourth embodiment of our invention shown in FIG. 8, air reservoir 20 and diesel compressor unit 36 are mounted on semi-trailer 10, rather than on flat car 12. While air reservoir 20 and compressor unit 36 are shown in FIG. 8 as mounted on the front semi-trailer 10, they can be mounted in other locations on semi-trailer 10 such as on the underside of the semi-trailer body. Air reservoir 20 is connected to train brake line 14 by air line 18. Air line 18 is connected to train brake line 14 by either coupling element 16, as described in the first embodiment of the invention, or coupling element 44 as described in the second embodiment of the invention.

Figure 9:
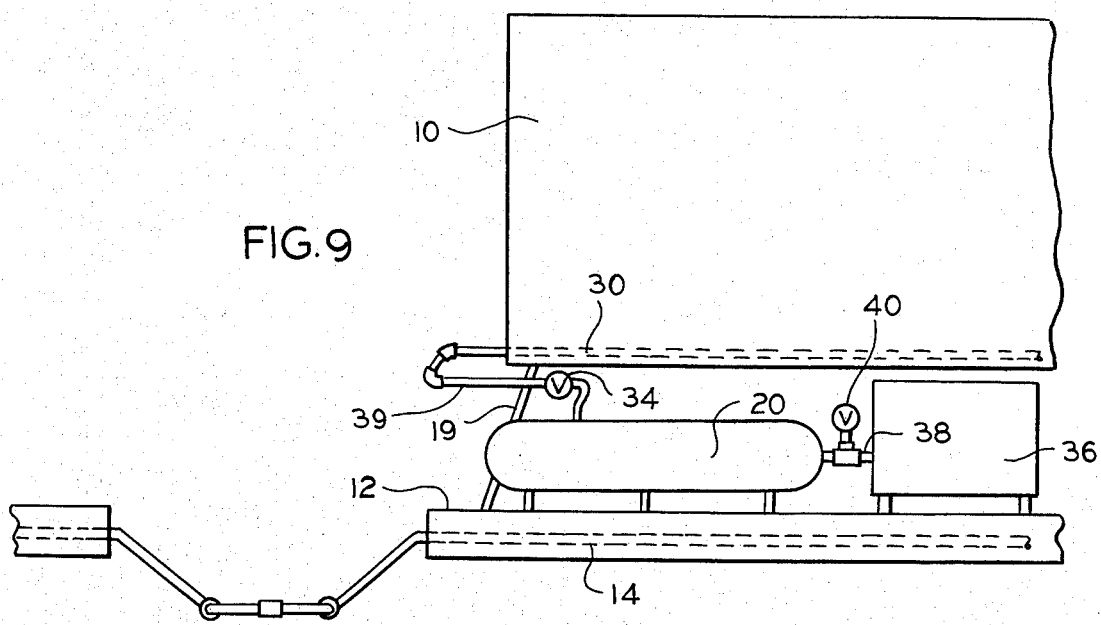
FIG. 9 is a fragmentary side elevational view of a piggyback semi-trailer mounted on a railroad flat car to illustrate a method of transporting cargo by using a fifth embodiment of the disclosed invention.
Figure 10:
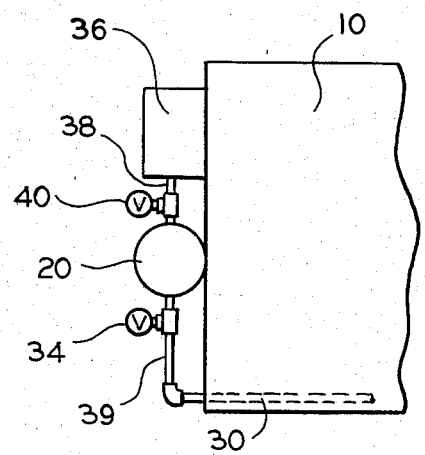
FIG. 10 is a fragmentary side elevational view of a piggyback semi-trailer mounted on a railroad flat car to illustrate a method of transporting cargo by using a sixth embodiment of the disclosed invention.

In a fifth and sixth embodiment of our invention shown in FIGS. 9 and 10, respectively, air reservoir 20 and compressor unit 36 are mounted on flat car 12 or semi-trailer 10, but air reservoir 20 is not connected to train brake line 14. Compressor unit 36 is the only source of compressed air for the reservoir 20. When air pressure is reservoir 20 falls below a predetermined level, switch valve 40 activates compressor 36 to restore and maintain the required level of air pressure in reservoir 20. Air is thus stored in reservoir 20 to inflate air bags 11 and maintain a constant air pressure in the bags 11.

Figure 11:
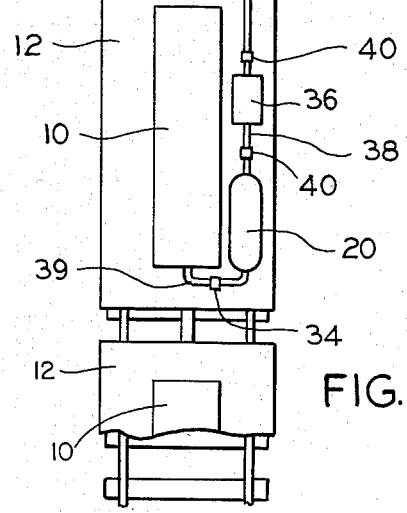
FIG. 11 is a plan view of several railroad cars loaded with piggyback semi-trailers comprising at least part of a train to illustrate a method of transporting cargo by using a seventh embodiment of the disclosed invention.
Figure 1A:
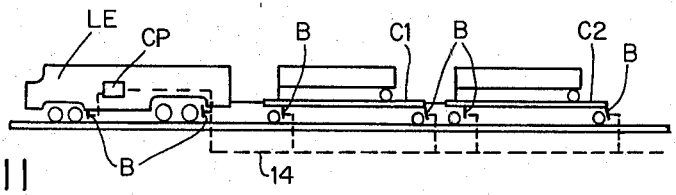
FIG. 1A is a schematic view of a train system incorporating the invention.

In a seventh embodiment of our invention shown in FIG. 11, compressor unit 36 is connected by several supply air lines 38 to air reservoirs located on other flat cars comprising part of the train and loaded with air-ride semi-trailers. Thus, an air compressor unit 36 need not be provided on each flat car carrying an air-ride semi-trailer since one compressor unit 36 can supply air through lines 38 to several air reservoirs 20 throughout the train.

In the operation of either of the first two embodiments of the invention described above, compressed air from brake line 14 flows through coupling 16 or coupling 44 to air reservoir 20 by way of supplemental air line 18 or 50, respectively. Valve 28 enables air to flow from brake line 14 to air reservoir 20 only when the pressure in brake line 14 is above a predetermined safety level, which is high enough to safety prevent unwanted activation of the train brakes. Valve 28 also prevents air from escaping from reservior 20 to the train brake line 14. Thus, air can be bled off from train brake line 14 and stored in reservoir 20 without imperiling the operation of the train braking system.

The air stored in reservoir 20 provides a supply of compressed air to operate air bags 11. Regulator valve 34 enables compressed air to flow from reservoir 20 into the air bags 11 when the pressure in bags 11 drops below a predetermined pressure due to air leakage in the suspension system and the exhausting of air from the bags as they are compressed to absorb the bumps and lateral sway when the train travels over rough track.

When air bags 11 are correctly inflated they suspend semi-trailer 10 above axles 15. Thus, they cushion semi-trailer 10 from the lateral sway and rough ride of flat car 12 which might otherwise be transmitted from car 12 through rear wheels 17. Because support 19 acts as a pivot at point 21, no lateral sway from the flat car 12 is transmitted to semi-trailer 10 by support 19.

In the operation of the third and fourth embodiments of the invention, diesel compressor unit 36 is provided to supply air to reservoir 20 when air pressure in the reservoir falls below the desired level and the reservoir cannot obtain replacement air from the train brake line 14 as described above in the operation of the first two embodiments of the invention. Switch valve 40 activates compressor 36 when the pressure in reservoir 20 falls below the desired level.

In the operation of the fifth, sixth and seventh embodiments of the invention, diesel compressor unit 36 supplies compressed air to reservoir 20. When the air pressure in reservoir 20 falls below a desired predetermined level, switch valve 40 activates compressor 36. The air stored in reservoir 20 thus provides a supply of compressed air to operate air bags 11. Regulator valve 34 insures that a constant predetermined pressure is maintained in bags 11.

While the principles of our invention have been described above in connection with specific embodiments and applications, it is to be understood that this description is made only by way of example and, therefore, the appended claims are to cover all equivalent structures.

We claim:

1. In a multi-car railroad train having an air brake system for supplying air during rail transport from a railroad car having a train air brake line to a conventional air suspension semi-trailer truck loaded on said railroad car, the semi-trailer truck having a conventional tractor and air suspension trailer, said trailer having an air suspension system normally connected to and supplied by air from an air-compressor on said tractor, whereby there is no air supply for the trailer air suspension system when the tractor is disconnected from the trailer during rail transport of the trailer, the combination of said train air brake system and said trailer air suspension system, said combination comprising air brake means for said railroad car, said brake means being connected to said train air brake line passing between railroad cars and extending to an engine of said train; an air supply line means connected between said trailer air suspension system and said train air brake line; and an air flow regulator means disposed in said air supply line means for preventing air from flowing from said train air brake line to said trailer air suspension system when the air pressure in said train air brake line drops below a predetermined level and for preventing air from flowing from said trailer suspension system to said train air brake line.

2. The system of claim 1 including air reservoir means disposed on said railroad car loaded with said semi-trailer and connected to said air supply line means between said air flow regulator means and said trailer air suspension system.

3. The system of claim 2 including a regulator valve means disposed in said air supply line means between said air reservoir means and said trailer air suspension system for controlling the flow of air from said air reservoir means to said trailer air suspension system, said regulator valve means maintaining a constant pressure in said trailer air suspension system to insure proper operation of said trailer air suspension system.

4. The system of claim 1 including air reservoir means disposed on said semi-trailer and connected to said air supply line means between said air flow regulator means and said trailer air suspension system.

5. The system of claim 4 including a regulator valve means disposed in said air supply line means between said air reservoir means and said trailer air suspension system for controlling the flow of air from said air reservoir means to said trailer air suspension system, said regulator valve means maintaining a constant pressure in said trailer air suspension system to insure proper operation of said trailer air suspension system.

6. A system for supplying air from a train air braking system to air-ride suspension trucks loaded on railroad cars comprising air brake means for said railroad cars, said brake means having air brake line means passing between said railroad cars and extending to an engine of said train; air-ride suspension means disposed in said trucks; an air supply line means connected between said air-ride suspension means on said trucks and said air brake line means of said train braking system; an air flow regulator means disposed in said air supply line means for preventing air from flowing from said train air brake line means to said air-ride suspension means on said truck when the air pressure in said air brake line means drops below a predetermined level and for preventing air from flowing from said air-ride suspension means to said air brake line means; air reservoir means disposed on said railroad cars loaded with said air-ride suspension trucks and connected to said air supply line means between said air flow regulator means and said air-ride suspension means; air compressor means disposed on said railroad cars loaded with said air-ride suspension trucks; a supplemental air supply line means connected between said air compressor means and said air reservoir means; and a switch valve means disposed in said supplemental air supply line means to activate said air compressor means when the air pressure in said reservoir means falls below a desired level, whereby the air pressure in said reservoir means will be maintained at a constant level.

7. A system for supplying air to air-ride suspension trucks loaded on railroad cars comprising brake means for said railroad cars, said brake means having air brake line means passing between said railroad cars and extending to an engine of said train; air-ride suspension means disposed in said trucks; an air supply line means connected between said air-ride suspension means and said air brake line means; an air flow regulator means disposed in said air supply line means for preventing air from flowing from said air brake line means to said air-ride suspension means when the air pressure in said air brake line means drops below a predetermined level and for preventing air from flowing from said air-ride suspension means to said air brake line means; air reservoir means disposed on said air-ride suspension truck and connected to said air supply line means between said air flow regulator means and said air-ride suspension means; air compressor means disposed on said air-ride suspension truck; a supplemental air supply line means connected between said air compressor means and said air reservoir means; and a switch valve means disposed in said supplemental air supply line means to activate said air compressor means when the air pressure in said reservoir means falls below a desired level, whereby the air pressure in said reservoir means will be maintained at a constant level.

8. A system for supplying air to air-ride suspension semi-trailers loaded on railroad cars comprising brake means for said railroad cars, said brake means having air brake line means passing between said railroad cars and extending to an engine of said train; each of said semi-trailers having at least one axle disposed under the rear of said semi-trailer for supporting said semi-trailers on said railroad car; a support means disposed on each of said railroad cars carrying a semi-trailer to support the front of said semi-trailer; a plurality of air bag means disposed between said axle and said semi-trailer; first air line means disposed in said semi-trailer and extending from the front of said semi-trailer to the rear; second air line means connected between said air bags and said first air line means; coupling means for connecting said air brake line of the railroad car loaded with said semi-trailer and the brake line of at least one adjacent railroad car; air reservoir means associated with said semi-trailer loaded on said railroad car; third air line means connecting said air reservoir to said coupling means whereby compressed air from said air brake line is supplied to said reservoir means; a fourth air line means connecting said air reservoir to said first air line means; regulator valve means disposed in said fourth air line means for controlling the flow of compressed air from said air reservoir means to said air bags, said regulator means maintaining a constant pressure to insure proper inflation of said air bags, whereby said semi-trailer is suspended above said axle and cushioned by said air bags to prevent damage to cargo being shipped in said semi-trailer.

9. A system for supplying air to air-ride suspension semi-trailers loaded on railroad cars comprising brake means for said railroad cars, said brake means having air brake line means passing between said railroad cars and extending to an engine of said train; each of said semi-trailers having at least one axle disposed under the rear of said semi-trailer for supporting said semi-trailers on said railroad car; a support means disposed on each of said railroad cars carrying a semi-trailer to support the front of said semi-trailer; a plurality of air bag means disposed between said axle and said semi-trailer; first air line means disposed in said semi-trailer and extending from the front of said semi-trailer to the rear; second air line means connected between said air bag means and said first air line means; coupling means for connecting said air brake line means of the railroad car loaded with said semi-trailer and the brake line means of at least one adjacent railroad car, said coupling means comprising a first hollow arm means connected to and communicating with said air brake line means of said railroad car loaded with said semi-trailer and the air brake line means of the adjacent railroad car; a hollow stem connected to and communicating with said first arm means; a second hollow arm means connected to and communicating with the end of said stem opposite said first hollow arm means; air reservoir means associated with said semi-trailer loaded on said railroad car; third air line means connecting said air reservoir means to said coupling means, said third air line means connected to and communicating with said second hollow arm means whereby compressed air from said air brake line means is supplied to said reservoir means; valve means disposed within said coupling means to prevent air from flowing from said air brake line to said third air line means when the air pressure in said air brake line means drops below a predetermined level and to prevent air from flowing from said third air line means to said air brake line means; a fourth air line means connecting said air reservoir means to said first air line means; regulator valve means disposed in said fourth air line means for controlling the flow of compressed air from said air reservoir means to said air bag means, said regulator means maintaining a constant pressure to insure proper inflation of said air bag means, whereby said semi-trailer is suspended above said axle and cushioned by said air bag means to prevent damage to cargo being shipped in said semi-trailer.

10. A system for supplying air to air-ride suspension semi-trailers loaded on railroad cars comprising brake means for said railroad cars, said brake means having air brake line means extending from an engine of said train to each railroad car of said train and being connected between each railroad car; each of said semi-trailers having at least one axle disposed under the rear of said semi-trailers for supporting said semi-trailer on said railroad car; a support means disposed on each of said railroad cars carrying a semi-trailer to support the front of said semi-trailers; a plurality of air bag means disposed between said axle and said semi-trailer; first air line means disposed in said semi-trailer and extending from the front to the rear of said semi-trailer; second air line means connected between said air bags and said first air line means; coupling means connected to said air brake line of the railroad car loaded with said semi-trailer at a point between the connections of the air brake line of said railroad car and the air brake lines of the adjacent railroad cars; air reservoir means associated with said semi-trailer loaded on said railroad car; third air line means connecting said air reservoir to said coupling means whereby compressed air from said air brake line is supplied to said air reservoir; a fourth air line means connecting said air reservoir to said first air line means; regulator valve means disposed in said fourth air line means for controlling the flow of compressed air from said air reservoir means to said air bags, said regulator means maintaining a constant pressure to insure proper inflation of said air bags, whereby said semi-trailer is suspended above said axle and cushioned by said air bags to prevent damage to cargo being shipped in said semi-trailer.

11. A system for supplying air to air-ride suspension semi-trailers loaded on railroad cars comprising brake means for said railroad cars, said brake means having air brake line means extending from an engine of said train to each railroad car of said train and being connected between each railroad car; each of said semi-trailers having at least one axle disposed under the rear of said semi-trailers for supporting said semi-trailer on said railroad car; a support means disposed on each of said railroad cars carrying a semi-trailer to support the front of said semi-trailers; a plurality of air bag means disposed between said axle and said semi-trailer; first air line means disposed in said semi-trailer and extending from the front to the rear of said semi-trailer; second air line means connected between said air bag means and said first air line means; coupling means connected to said air brake line means of the railroad car loaded with said semi-trailer at a point between the connections of the air brake line means of said railroad car and the air brake line means of the adjacent railroad cars, said coupling means comprising a hollow arm connected to and communicating with said brake air line means of said railroad car loaded with said semi-trailer; a hollow stem connected to and communicating with said hollow arm; air reservoir means associated with said semi-trailer loaded on said railroad car; third air line means connecting said air reservoir means to said coupling means, said third air line means connected to and communicating with said hollow stem whereby compressed air from said air brake line means is supplied to said air reservoir means; valve means disposed in said coupling means to prevent air from flowing from said air brake line means to said third air line means when the air pressure in said air brake line means drops below a predetermined level and to prevent air from flowing from said third air line means to said air brake line means; a fourth air line means connecting said air reservoir means to said first air line means; regulator valve means disposed in said fourth air line means for controlling the flow of compressed air from said air reservoir means to said air bag means, said regulator means maintaining a constant pressure to insure proper inflation of said air bag means, whereby said semi-trailer is suspended above said axle and cushioned by said air bag means to prevent damage to cargo being shaped in said semi-trailer.

12. The system of claim 9 or 11 wherein said valve means comprises a housing having an input and two output parts formed therein, the first output port communicating with said air brake line and the second output port communicating with said hollow stem; spring biased means in said valve for normally closing said second output port, a predetermined pressure in said air brake line means operating said spring means against said bias to open said normally closed second output port and thereby enabling compressed air from said air brake line to flow through said coupling element to said air reservoir.

13. The system of claim 12 wherein each of said output ports has a preselected area to enable a predetermined volume of air to flow therethrough during a unit period of time.

14. A system for supplying air to air-ride suspension semi-trailers loaded on railroad cars comprising brake means for said railroad cars, said brake means having air brake line means passing between said railroad cars and extending to an engine of said train; each of said semi-trailers having at least one axle disposed under the rear of said semi-trailer for supporting said semi-trailers on said railroad car; a support means disposed on each of said railroad cars carrying a semi-trailer to support the front of said semi-trailer; a plurality of air bag means disposed between said axle and said semi-trailer; first air line means disposed in said semi-trailer and extending from the front of said semi-trailer to the rear; second air line means connected between said air bag means and said first air line means; coupling means for connecting said air brake line means of the railroad car loaded with said semi-trailer and the brake line means of at least one adjacent railroad car; air reservoir means associated with said semi-trailer loaded on said railroad car; third air line means connecting said air reservoir means to said coupling means whereby compressed air from said air brake line means is supplied to said reservoir means; a fourth air line means connecting said air reservoir means to said first air line means; regulator valve means disposed in said fourth air line means for controlling the flow of compressed air from said air reservoir means to said air bag means, said regulator means maintaining a constant pressure to insure proper inflation of said air bag means, whereby said semi-trailer is suspended above said axle and cushioned by said air bag means to prevent damage to cargo being shipped in said semi-trailer; air compressor means associated with said semi-trailer loaded on said railroad car; a fifth-air line means connecting said air compressor means to said air reservoir means; and a switch valve means disposed in said fifth air line means to activate said air compressor means when the air pressure in said reservoir means falls below a desired level, whereby the air pressure in said reservoir means will be maintained at a constant level.

15. The system of claim 14 wherein said air reservoir means and said air compressor means are disposed on said railroad car loaded with said semi-trailer.

16. The system of claim 14 wherein said air reservoir means and said air compressor means are disposed on said semi-trailer loaded on said railroad car.

17. A system for supplying air to air-ride suspension semi-trailers loaded on railroad cars comprising air-ride suspension means disposed in each of said semi-trailers; air reservoir means associated with each of said semi-trailers loaded on said railroad cars; first air line means connecting said air reservoirs to said air-ride suspension means; air compressor means associated with each of said semi-trailers loaded on said railroad cars to supply compressed air to said air reservoirs; second air line means connecting said air compressor means to said air reservoir means; switch valve means disposed in said second air line means to activate said air compressor means when the air pressure in said reservoir means falls below a desired level, whereby the air pressure in said reservoir will be maintained at a constant level; and regulator valve means disposed in said first air line means for controlling the flow of compressed air from said air reservoirs to said air-ride suspension systems, said regulator valve means maintaining a constant pressure in said air-ride suspension systems to insure proper operation and thereby prevent damage to cargo being shipped in said semi-trailers.

18. The system of claim 17 wherein said air reservoir means and said air compressor means are disposed on said railroad cars loaded with said semi-trailers.

19. The system of claim 17 wherein said air reservoir means and said air compressor means are disposed on said semi-trailers loaded on said railroad cars.

20. A system for supplying air to air-ride suspension trucks loaded on a plurality of railroad cars forming at least part of a train comprising air-ride suspension means disposed in each of said trucks; air reservoir means associated with each of said air-ride trucks loaded on said plurality of railroad cars; first air line means connecting each of said air reservoir means to said air-ride suspension means; air compressor means associated with at least one of said air-ride trucks loaded on said plurality of railroad cars to supply compressed air to at least two of said air reservoir means associated with each of said air-ride trucks; second air line means connecting said air compressor means to at least two of said air reservoir means associated with each of said air-ride trucks loaded on said plurality of railroad cars; switch valve means disposed in said second air line means to activate said air compressor means when air pressure in said air reservoir means connected to said air compressor means falls below a desired level, whereby the air pressure in each of said reservoir means connected to said compressor will be maintained at a constant level; and a regulator valve means disposed in said first air line means for controlling the flow of compressed air from said air reservoir means to said air-ride suspension means, said regulator valve means maintaining a constant pressure in said air-ride suspension means to insure proper operation and thereby prevent damage to cargo being shipped in said air-ride trucks.

* * * * *